(12) United States Patent  (10) Patent No.: US 6,664,652 B2
Chane-Waye                  (45) Date of Patent:    Dec. 16, 2003

(54) STARTER EQUIPPED WITH A TORQUE-LIMITER AND DAMPER DEVICE

(75) Inventor: Olivier Chane-Waye, Lyons (FR)

(73) Assignee: Valeo Equipement Electriques Moteur, Creteil (FR)

(*) Notice: Subject to any disclaimer, the term of this patent is extended or adjusted under 35 U.S.C. 154(b) by 61 days.

(21) Appl. No.: 09/914,582
(22) PCT Filed: Dec. 20, 2000
(86) PCT No.: PCT/FR00/03619
§ 371 (c)(1),
(2), (4) Date: Aug. 30, 2001
(87) PCT Pub. No.: WO01/50016
PCT Pub. Date: Jul. 12, 2001

(65) Prior Publication Data
US 2002/0135186 A1 Sep. 26, 2002

(30) Foreign Application Priority Data
Dec. 30, 1999 (FR) .............................. 99 16726

(51) Int. Cl.[7] .............................................. F02N 11/00
(52) U.S. Cl. ....................................... 290/38 R; 74/7 E
(58) Field of Search ........................... 290/36 R, 38 R, 290/46; 74/7 E

(56) References Cited

U.S. PATENT DOCUMENTS

| 4,503,719 A | * | 3/1985 | Hamano ..................... 74/7 E |
| 4,680,979 A | * | 7/1987 | Morishita et al. ........... 74/7 E |
| 4,848,172 A | * | 7/1989 | Morishita .................... 74/7 E |
| 5,189,921 A | * | 3/1993 | Nagashima et al. .......... 74/7 A |
| 5,323,663 A | * | 6/1994 | Ohgi et al. .................. 74/7 E |
| 5,533,415 A | * | 7/1996 | Ackermann et al. ........ 74/7 E |
| 5,905,309 A |   | 5/1999 | Ohmi et al. ............... 290/36 R |
| 5,905,310 A | * | 5/1999 | Nagao ......................... 290/46 |
| 6,076,413 A | * | 6/2000 | Verot et al. ................. 74/7 E |
| 6,109,122 A | * | 8/2000 | Bori et al. ................... 74/7 E |
| 6,239,503 B1 | * | 5/2001 | Ikeda et al. .............. 290/38 R |

FOREIGN PATENT DOCUMENTS

| EP | 0854284 | 6/1987 | |
| FR | 2639701 A3 | * 6/1990 | ............ F02N/15/00 |
| FR | 2591824 | 7/1998 | |
| JP | 09280144 A | * 10/1997 | |
| WO | WO 39454 A1 | * 7/2000 | ............ F02N/15/04 |

* cited by examiner

Primary Examiner—Joseph Waks
(74) Attorney, Agent, or Firm—Liniak, Berenato & White

(57) ABSTRACT

A motor-vehicle starter of the type including an electric motor (10) including a cylindrical casing (24) within which the crown ring (58), internally toothed, of a planetary gear train (22) is mounted so as to rotate, and of the type in which the crown ring (58) is linked in rotation to the casing (24) by way of a torque-limiter device which is interposed between the crown ring (58) and a lateral flange (30, 34) and which consists of at least one annular, friction side face (82, 84) of the crown ring (58) and of a disc (88, 89) which is linked in rotation to the casing (24), which are pressed axially and elastically against one another by an elastic element (112), wherein the disc (88, 89) is linked in rotation to the casing (24) by way of at least one damper block (92), elastically deformable, which absorbs mechanical energy when it is compressed, in such a way as to damp the variations in torque transmitted to the crown ring (58).

14 Claims, 4 Drawing Sheets

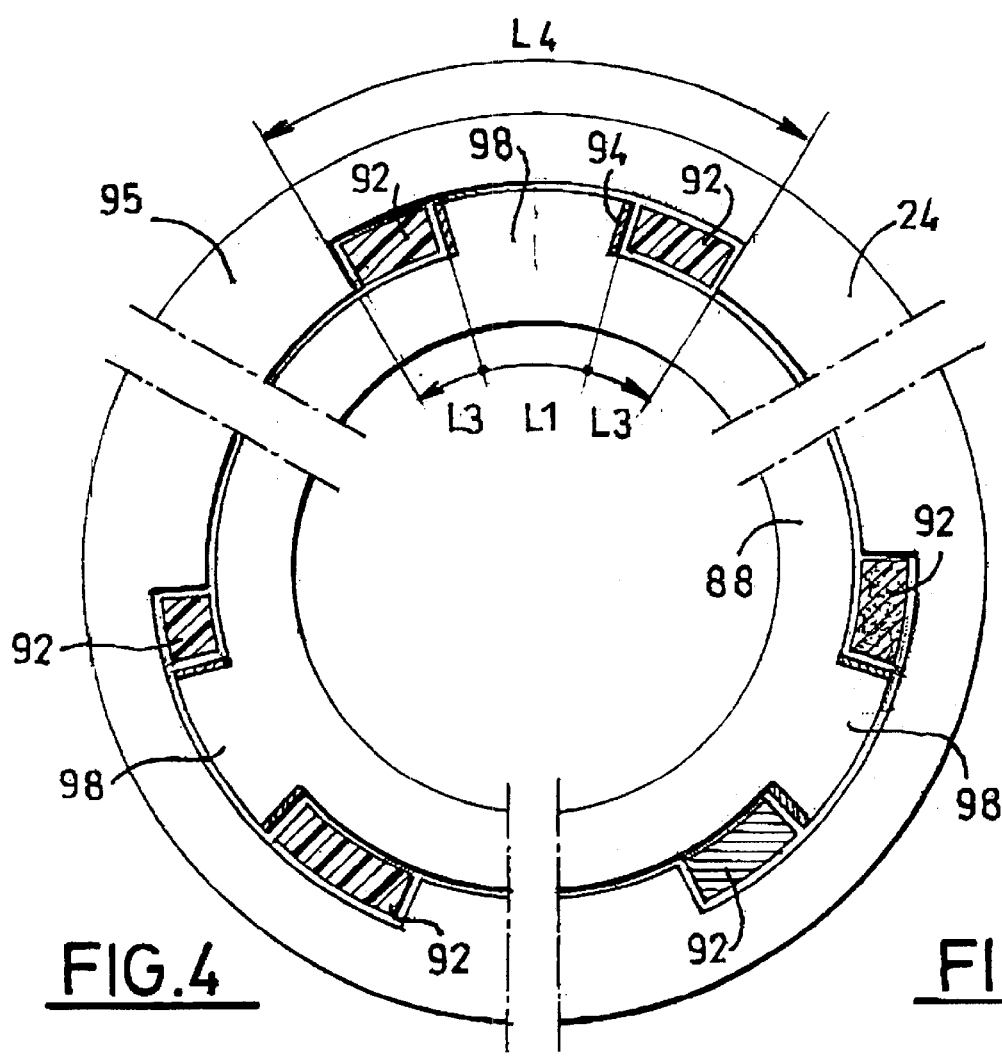

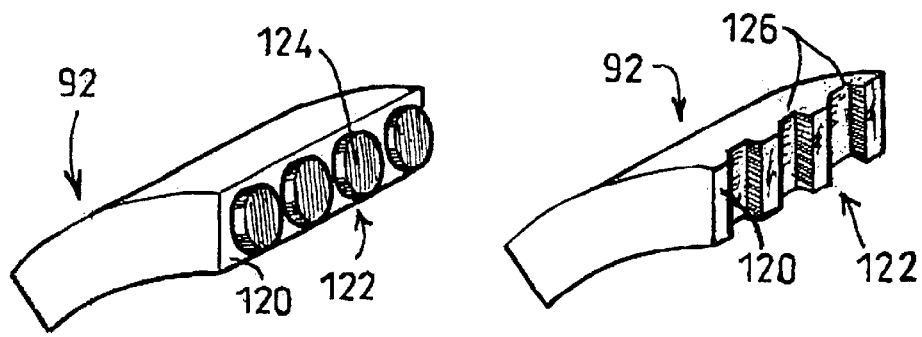
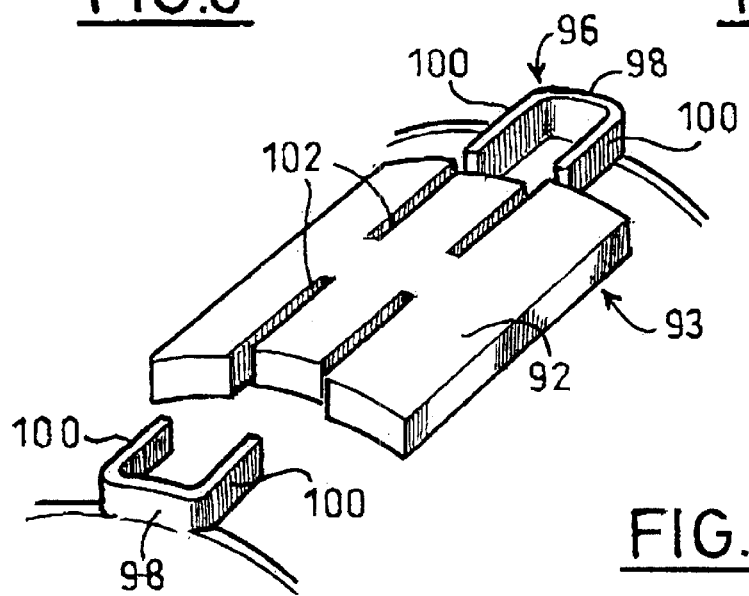
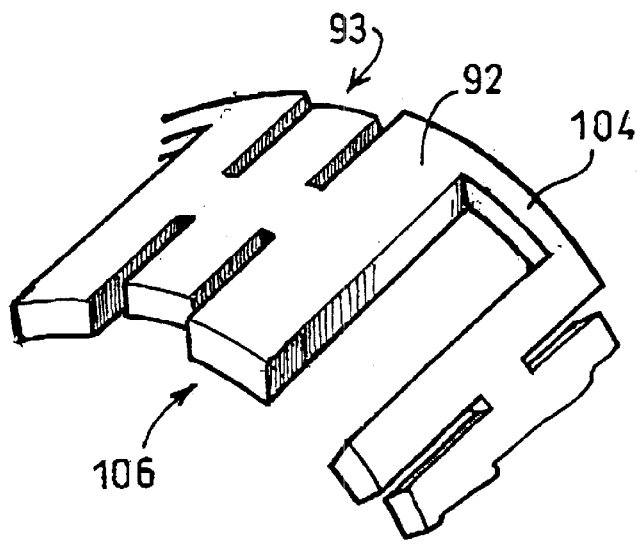

STARTER EQUIPPED WITH A TORQUE-LIMITER AND DAMPER DEVICE

BACKGROUND OF THE INVENTION

1. Field of the Intention

The present invention relates to a motor-vehicle starter.

The invention relates more particularly to a starter of the type including an electric motor the output shaft of which rotationally drives a coaxial inertia-type drive with the interposition of a step-down planetary-meshing gear train.

2. Discussion of the Related Art

In order to limit the value of the maximum torque which can be transmitted between the output shaft of the electric motor and the shaft of the inertia-type drive, it is known to provide a torque-limiter device.

To that end, a friction-type torque-limiter device has already been proposed, in which at least one friction disc is pressed by an elastic element against an annular, side face of the crown ring of the step-down planetary gear train of the starter, the other face of the crown ring being in contact with a second friction disc. Moreover, the friction disc is linked in rotation to the casing.

The pressure exerted by the elastic element on the friction disc makes it possible to limit the torque to which the crown ring of the planetary gear train is subjected. This is because, when the torque is greater than the resisting torque which is due to the friction between the friction disc and the crown ring of the planetary gear train, this latter element is driven in rotation by the crown ring within the casing.

This device makes it possible to limit the torque due to substantial overloads on the starter However, it does not make it possible to protect the elements of the starter against moderate torque oscillations. These moderate oscillations do not entail the immediate breaking of the crown ring or of another element of the planetary gear train, but cause wear by fatigue which may, for example, cause the breaking of a tooth of a toothed element.

Certain devices propose using damper elements. The European patent EP-A-0.529.456 thus proposes a starter which includes a torque-limiter device as well as a damper.

The crown ring of the planetary gear train then includes two circular chambers separated by a transversely oriented partition. The inner annular periphery of one of the chambers carries teeth which interact with the toothing of the satellite gears. The inner annular periphery of the other chamber, for its part, includes recesses which make it possible to accommodate elements made of damping material. Axial claws of a transverse disc are inserted into the elements made of damping material. The transverse faces of the disc are in contact, on the one hand, with a transverse face of the casing and, on the other hand, with a friction ring which is pressed elastically towards the disc.

When the crown ring is subjected to moderate torque variations, each damping-material element is compressed between a claw and an opposing side face of a recess in such a way as to damp the oscillations and to limit the fatigue of the elements of the planetary gear train.

When the torque is more substantial and exceeds the value of the resisting torque, due to the friction of the disc on the friction ring and the casing, the disc is no longer immobilised; the crown ring then drives it in rotation.

Although the device proposed in this document makes it possible to damp the moderate variations in torque as well as substantial overloads on the starter, this solution entails a substantial axial bulk, as well as complicated machining operations, especially of the crown ring. This is because it requires two chambers to be produced, one including the drive teeth, and the other the recesses intended to accommodate the damping-material elements.

Moreover, this device cannot be transposed into a friction-type torque-limiter device in which the crown ring of the planetary gear train is held axially under pressure between two flanges.

SUMMARY OF THE INVENTION

The object of the invention is to propose a new design of a starter including a torque-limiter and damper device which remedies the drawbacks which have just been set out.

To this end, the invention proposes a motor-vehicle starter of the type including an electric motor the output shaft of which rotationally drives a coaxial inertia-type drive with the interposition a step-down planetary gear train including a cylindrical casing within which the crown ring, internally toothed, of the planetary gear train is mounted so as to rotate, and of the type in which the crown ring is linked in rotation to the casing by way of a friction-type torque-limiter device which is interposed axially between the crown ring and a lateral flange of the casing and which consists of at least one annular, friction side face of the crown ring and of a disc which is linked in rotation to the casing, which are pressed axially and elastically against one another by an elastic element bearing axially on a reaction surface of the disc, characterised in that the disc is linked in rotation to the casing by way of at least one damper block, elastically deformable, which absorbs mechanical energy when it is compressed, in such a way as to damp the variations in torque transmitted to the crown ring.

According to other characteristics of the invention:

the resisting torque, due to the friction, between the reaction surface of the disc and the elastic element is less than the torque between the disc and the crown ring;

the casing, in its inner periphery, includes at least one axial recess which is limited in angle, and in which is lodged at least one damper block;

the disc, at its outer periphery, includes at least one lug which carries at least one compression tab extending axially inside the axial recess, and in that [sic] the damper block is interposed in an angular way between at least one axial face of a compression tab and an opposing side face of the axial recess;

each compression tab is interposed in an angular way between two damper blocks lodged in the same axial recess;

the two damper blocks are produced as a single damper element including an axial slot in which the compression tab is accommodated;

the disc is a component made from cut-out and folded sheet metal with the lug and the compression tab produced as a single piece;

each compression tab is accommodated between two adjacent blocks so as to interact with one or the other depending on the direction of rotation of the starter;

the damper block is made of elastomer material;

the damper block includes protrusions, on an axially oriented side face, so as to provide an energy-absorption capability which is variable as a function of the compression of the damper block along a substantially tangential direction;

several damper blocks are distributed over an angle;

the damper blocks are linked together so as to constitute an annular sleeve;

an intermediate ring is interposed between the disc and the elastic element, and in that [sic] the resisting friction torque between the ring and the disc is less than the torque between the disc and the crown ring;

the ring is prevented from rotating with respect to the casing.

BRIEF DESCRIPTION OF THE DRAWINGS

Other characteristics and advantages of the invention will emerge on reading the detailed description which follows, for an understanding of which reference will be made to the attached drawings, among which:

FIG. 1A represents, in detail, a part of the damper and limiter device represented in FIG. 1;

FIGS. 3 to 5 represent a cross-section of an angular sector of the torque-limiter and damping device produced in accordance with the teachings of the invention;

FIGS. 6 and 7 represent two damper blocks linked together into a single damper element;

FIGS. 8 and 9 represent, partially in perspective, a damper block according to variants of the invention.

DETAILED DESCRIPTION OF THE PREFERRED EMBODIMENT

Figure 1:
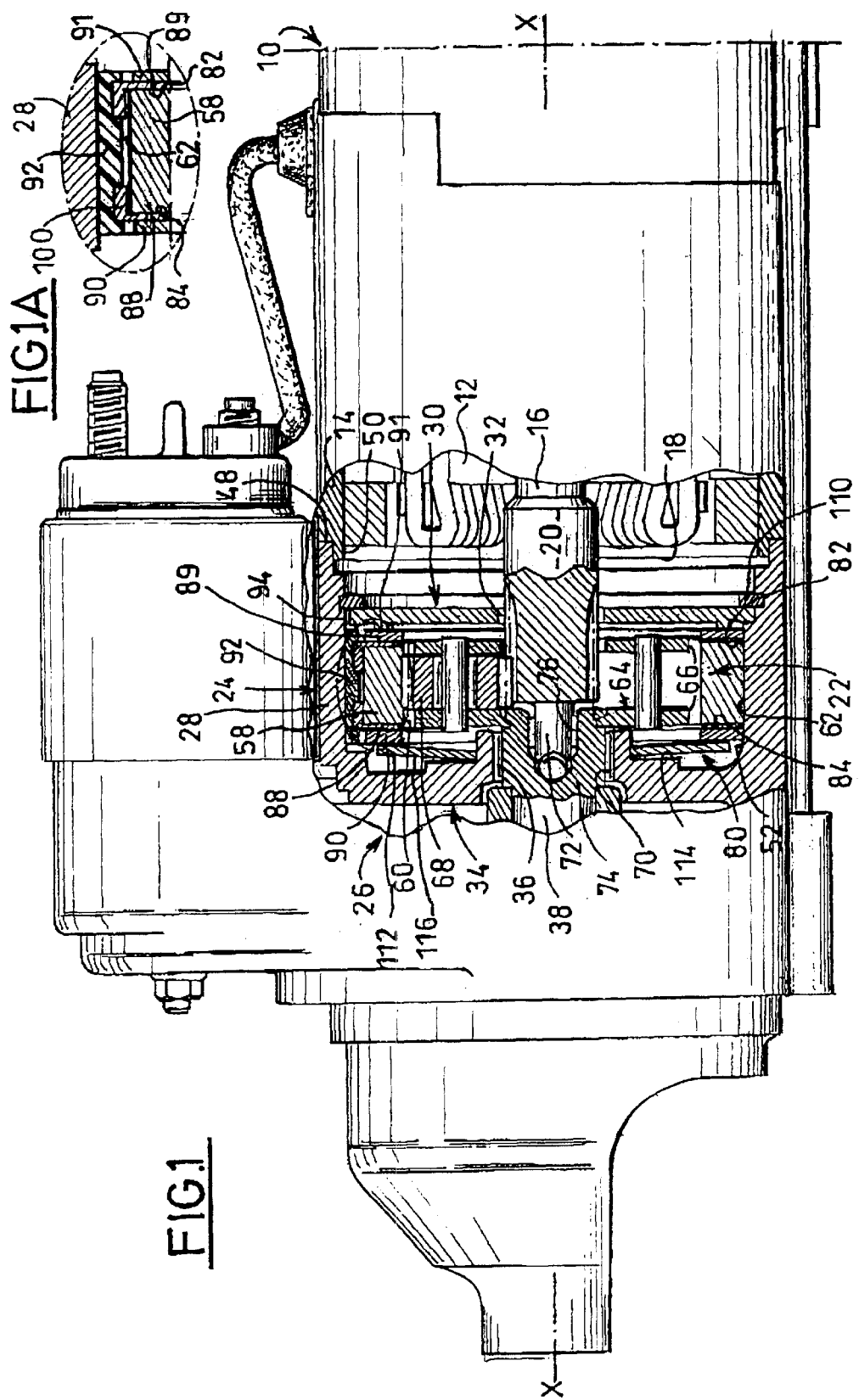
FIG. 1 is a view in partial axial section of the electric motor of a starter associated with a planetary gear train including a torque-limiter and damper device produced in accordance with the teachings of the invention.

In FIG. 1 has been represented an electric motor 10 belonging to a starter of a motor vehicle (not represented in detail), the rotor 12 of which is mounted so as to rotate about an axis X—X within a casing or stator 14, these two elements 12 and 14 being represented diagrammatically in the figure.

The output shaft 16 of the electric motor 10, linked in rotation to the rotor 12, projects axially beyond the front face 18 of the stator 14 and rotationally drives a pinion 20 which is the sun pinion of a planetary gear train 22 arranged within the casing 24 of a step-down gear 26 associated with the electric motor 10.

The casing 24 consists in essence of a cylindrical annular skirt 28, of a disc-shaped rear flange 30, pierced at its centre 32 in order to let through the sun pinion 20 and the output shaft 16, and of a front lateral flange 34, pierced at its centre 36 in order to let through the output shaft 38 of the step-down gear 26, which is intended to drive the inertia-type drive (not represented) of the starter in rotation by way of splines (not represented).

According to one variant, the skirt 28 is a part of the front bearing of the starter, the flange 34 then being a fixed component.

The rear axial extremity 48 of the skirt 28 includes a bearing surface 50 for centring the skirt 28 on a complementarily shaped part of the front extremity of the stator 14 of the electric motor 10.

The skirt 28 is fixed axially to the stator 14 by a series of tie rods which are not represented in the figure.

The annular cylindrical skirt 28 of the casing 24 includes an internal bore 52.

The planetary gear train 22 includes an annular crown ring 58, toothed internally 60, and the outer cylindrical surface 62 of which is mounted so as to rotate within the bore 52 of the skirt 28.

The planetary gear train 22 also includes a satellite-gear carrier 64 which is linked in rotation to the output shaft 38 and which consists of two plates 66 which carry, rotating, toothed satellite gears 68 which interact with the internal toothing 60 of the crown ring 58 and with the external toothing of the sun pinion 20.

The output shaft 38 is mounted so as to rotate in the piercing 36 of the front flange 34 with the interposition of a needle-type bush 70, while the free front extremity 72 of the sun pinion 20 is mounted so as to rotate within the rear extremity 74 of the output shaft 38, with the interposition, for example, of a series of needles 76.

The toothed crown ring 58 is linked in rotation to the skirt 28 of the fixed casing 24 by way of a torque-limiter and damper device 80 the crown ring 58 of which constitutes one of the components.

To that end, the crown ring 58 is produced from a material, for example a filled plastic material, possessing good friction and friction-wear resistance characteristics.

The toothed crown ring 58 is bounded laterally by two rear 82 and front 84 annular side faces which constitute two annular friction surfaces of the torque-limiter device 80.

The torque-limiter and damper device 80, a part of which is represented in detail in FIG. 1A, especially includes two discs 88, 89 and two intermediate rings 90, 91 which are situated at the front and at the rear of the crown ring 58 respectively. Damper blocks 92 are distributed at the outer periphery of the crown ring 58; they are arranged in the inner periphery of the skirt 28, in axial recesses 94 which are distributed regularly, for example at 120°, in accordance with FIG. 2. The recesses are separated from one another by axial ribs 95.

The damper blocks 92 are produced from a material which makes it possible to absorb shocks, such as a natural or synthetic elastomer. They may also consist of a spring of the oblong spring, leaf spring, etc, type.

The damper blocks 92 can be reinforced by a spring-metal strip which is then fixed, for example, by overmoulding of the block 92, by bonding or by insertion.

The discs 88 include radial lugs 96 which are distributed at their outer periphery facing the recesses 94 of the skirt 28. Each lug 96 includes a central part 98 which extends radially outwards in the same plane as the discs 88 and 89, as well as two compression tabs 100 which extend axially towards the disc 88 or 89 opposite.

The lugs 96 may be produced by cutting-out and by folding with the discs 88 and 89 which include them.

Figure 2:
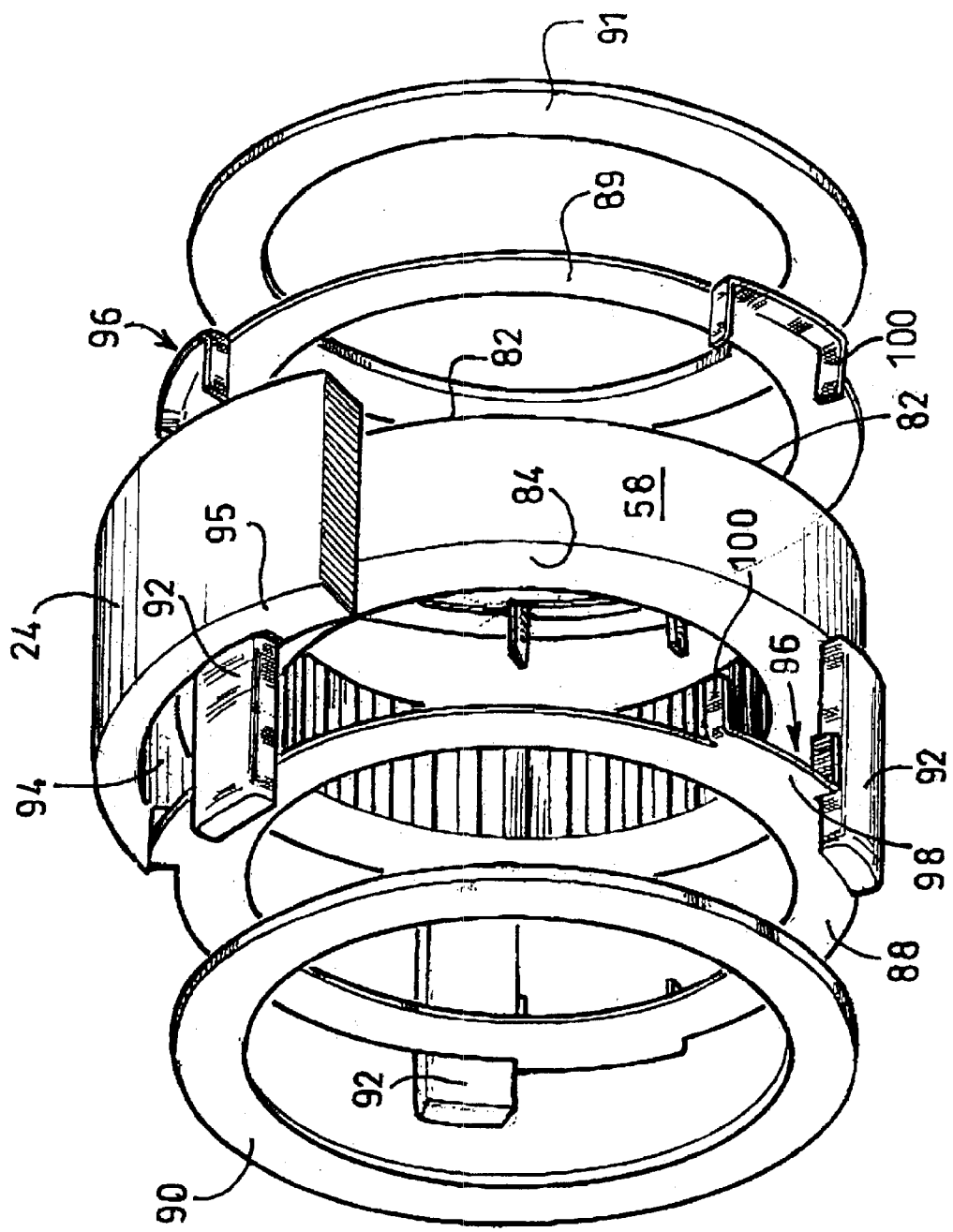
FIG. 2 represents, in exploded perspective, the principal elements which constitute the torque-limiter and damper device in accordance with the teachings of the invention.

During the assembly of the starter, a damper block 92 is arranged on one single side of the lugs 96, in accordance with FIG. 2. The device 80 then damps the torque variations in a single direction.

Advantageously, in accordance with FIG. 3, damper blocks 92 are arranged over an angle or tangentially on each side of the lugs 96. To do this, it is necessary for the sum of the width L1 of the lugs 96 and of the widths L2 and L3 of the blocks 92 to be substantially equal to the width L4 of the recesses 94.

The use of damper blocks 92 on each side of the lugs 96 makes it possible to damp the torque variations when the starter generates an overload or when it receives one. However, these two types of overload may have different values which it is sometimes possible to determine approximately. Hence it may be advantageous to use a different block 92 on each side of the lugs 96.

Advantageously, in order to optimise the reactions of the device 80, it is possible to use damper blocks 92 having shapes, dimensions, in accordance with FIG. 4, or different materials, in accordance with FIG. 5.

When a damper block 92 is used on each side of the lugs 96, it is advantageous to merge them together into a single damper element 93 in accordance with FIG. 6. The compression tabs 100 are then accommodated in axial slots 102 produced for this purpose.

In order to facilitate the assembling of the damper elements 93 in the skirt 28 of the casing 24, they may be linked together by an annular sector 104 in accordance with FIG. 7. Thus, the damper elements 93 form an annular sleeve 106 which is preassembled with the crown ring 58 and the discs 88 and 89. The assembly of these elements is then inserted axially into the bore 52 of the skirt 28, each damper element 93 then being inserted into one recess 94.

Each of the rear 82 and front 84 annular side faces bears axially against the opposing inner face of a disc 88 and 89 the outer face of which is in contact with an intermediate ring 90 and 91 respectively.

The rear intermediate ring 91 bears on the rear flange 30 of the casing 24.

The rear flange 30 is retained axially inside the skirt 24 by way of a ring 110 which is mounted in an internal radial groove of the skirt 28.

An elastic element 112, produced in the form of a frustoconical elastic washer, is mounted axially compressed between the inner annular face 114 of the front transverse flange 34 and the front annular face 116 of the intermediate ring 90.

The elastic washer 112 is centred on a cylindrical bearing surface of the front transverse flange 34 which extends radially inwards.

The washer 112 thus provides a force for axial compression of the assembly consisting of the discs 88 and 89, the intermediate rings 90 and 91, the crown ring 58 and the rear transverse flange 30, against the end stop consisting of the retaining ring 110.

The value of the axial elastic force applied by the washer 112 to this assembly, as well as the value of the coefficient of friction between the surfaces in contact, determine the value C1 of the torque from which the torque-limiter and damper device 80 damps the torque variations, and determine as well as [sic] the value C2 of the maximum admissible torque exerted on the crown ring 58.

Thus, the coefficient of friction between the discs 88, 89 and the intermediate rings 90, 91 is lower than the coefficient of friction between the discs 88, 89 and the crown ring 58.

The faces of the discs 88, 89 may include a different lining so as to exhibit a coefficient of friction which is higher on the face in contact with the intermediate rings 90, 91 than on the annular side face 88, 89 [lacuna] the crown ring 58.

When the starter is operating, the crown ring 58 is subjected to a torque C. The resisting torques due to the friction forces in the region of the surfaces in contact make it possible to immobilise the crown ring 58 as long as C remains less than C1. When the value of the torque C exceeds the value of the torque C1, slippage occurs between the discs 88, 89 and the intermediate rings 90, 91. The assembly consisting of the crown ring 58 and the discs 88, 89 is then slightly driven in rotation with respect to the casing 24. The damper blocks 92, situated in the direction of rotation with respect to the lugs 96, are then compressed, along a tangential direction, between the compression tabs 100 and the angular-extremity side faces of the recesses 94 which makes it possible to damp the shocks and thus to reduce the wear on the elements of the starter. Their compression, and consequently the angle of rotation of the assembly, is an increasing function of the torque C.

The coefficient of friction between the discs 88, 89 and the intermediate rings 90, 91, as well as the axial compression force of the washer 112, are determined in such a way that the application of a lesser torque to causes only limited wear (by fatigue) of the elements of the starter such as the meshing teeth of the crown ring 58.

When the value of the torque C increases and becomes greater than the maximum admissible value C2, for example in the event of a shock or of a torsional jolt of the internal-combustion engine, the adhesion forces between the discs 88, 89 and the crown ring 58 are insufficient to immobilise the crown ring 58 with respect to the casing 24 of the step-down gear 26, and the latter then begins to turn on the discs 88, 89 and thus limits the torque transmitted to the value C2 by dissipating the excess mechanical energy by friction.

Thus the torque-limiter and damper device 80 operates successively in three phases in the course of the increasing of the torque C to which the crown ring 58 is subjected.

When the torque C is less than the torque C1, the transmission of the forces from the electric motor 10 to the output shaft 38 of the step-down gear 26 is total.

When the torque C lies between the torque C1 and the torque C2, the device 80 absorbs some of the forces; it then operates as a damper.

Then, when the torque C becomes greater than the torque C2, the device 80 limits the torque transmitted by the crown ring 58 to the value of the torque C2.

With the damping phase appearing only when the torque C is greater than the torque C1, the device 80 makes it possible to prevent oscillations of the crown ring 58 for slight variations in the torque C.

According to one variant, in order for the damping of the variations in the torque C to be more progressive, when its value lies between those of the torques C1 and C2, the side face 120 of the damper blocks 92 which is opposite an angular-extremity side face of the recesses 94 includes protrusions 122. Hence the damper blocks 92 have an energy-absorption capacity which is variable as a function of their compression along a substantially tangential direction.

The protrusions 122, which may be pellets 124 affixed to the face 122, in accordance with FIG. 8, or recesses with a triangular cross-section 126 formed in the face 120, in accordance with FIG. 9 [sic]. Hence, the protrusions 122 exhibit constant or non-constant cross-sections which have a greater elasticity and which are compressed more easily than the rest of the damper blocks 9 under a light loading.

The design of the device 80 according to the invention is particularly compact axially since it includes elements taking the form [lacuna] the discs 88, 89 and/or of rings 90, 91 featuring a small axial bulk.

Advantageously, each pair consisting of a disc 88, 89 and of an intermediate ring 90, 91 can be produced as a single piece. In this case, each face of the single piece should feature a different coefficient of friction so that the face in contact with an annular side face 82, 84 of the crown ring 58 transmits the torque C up to the value C1, and so that the other face transmits the torque C up to the value C2.

It is also possible to use only a single disc 88 or 89, which allows an additional reduction in the axial bulk of the device 80.

Moreover, the rear intermediate ring 91 and the rear flange 30 can be produced as a single piece, on condition that the front face of the intermediate ring allows the rear disc 89 to slip when the torque C is greater than the torque C2.

The assembling of the components is particularly easy, and all the components of the planetary gear train 22 and of the torque-limiter and damper device 80 can be assembled within the casing 24 and held in place by way of the ring 110; the subassembly thus constituted can then be put in place on the stator 14 of the motor 10, the sun pinion 20 associated in rotation with the output shaft 16 of the motor 10 then penetrates inside the step-down gear 26.

What is claimed is:

1. Motor-vehicle starter including an electric motor (10) an output shaft (16) of which rotationally drives a coaxial drive with the interposition a step-down planetary gear train (22) including a cylindrical casing (24) within which a crown ring (58), internally toothed, of the planetary gear train (22) is mounted so as to rotate, and of the type in which the crown ring (58) is linked in rotation to the casing (24) by way of a friction-type torque-limiter device which is interposed axially between the crown ring (58) and a lateral flange (30, 34) of the casing (24) and which consists of at least one annular, friction side face (82, 84) of the crown ring (58) and of a disc (88, 89) which is linked in rotation to the casing (24), which are pressed axially and elastically against one another by an elastic element (112) bearing axially on a reaction surface of the disc (88, 89), wherein the disc (88, 89) is linked in rotation to the casing (24) by way of at least one damper block (92), elastically deformable, which absorbs mechanical energy when it is compressed, in such a way as to damp the variations in torque transmitted to the crown ring (58).

2. Starter according to claim 1, wherein the resisting torque, due to the friction, between the reaction surface of the disc (88) and the elastic element (112) is less than the torque between the disc (88) and the crown ring (58).

3. Starter according to claim 1, wherein the casing (24), in its inner periphery, includes at least one axial recess (94) which is limited in angle, and in which is lodged at least one damper block (92).

4. Starter according to claim 1, wherein the disc (88, 89), at its outer periphery, includes at least one lug (98) which carries at least one compression tab (100) extending axially inside the an axial recess (94), and in that the damper block (92) is interposed in an angular way between at least one axial face of a compression tab (100) and an opposing side face of the axial recess (94).

5. Starter according to claim 4, wherein each said compression tab (100) is interposed in an angular way between two damper blocks (92) lodged in the same axial recess (94).

6. Starter according to claim 5, wherein the two damper blocks (92) are produced as a single damper element (93) including an axial slot (102) in which the compression tab (100) is accommodated.

7. Starter according to claim 1, wherein the disc (88, 89) is a component made from a cut-out and folded sheet metal with the lug (98) and the compression tab (100) produced as a single piece.

8. Starter according to claim 4, wherein each compression tab (100) is accommodated between two adjacent blocks (92) so as to interact with one or the other depending on the direction of rotation of the starter.

9. Starter according to claim 1, wherein the damper block (92) is made of elastomer material.

10. Starter according to claim 1, wherein the damper block (92) includes protrusions (122), on an axially oriented side face, so as to provide an energy-absorption capability which is variable as a function of the compression of the damper block (92) along a substantially tangential direction.

11. Starter according to claim 1, wherein several said damper blocks (92) are distributed over an angle.

12. Starter according to claim 1, wherein the damper blocks (92) are linked together so as to constitute an annular sleeve (106).

13. Starter according to claim 1, wherein an intermediate ring (90) is interposed between the disc (88) and the elastic element (112), and in that the resisting friction torque between the ring (90) and the disc (88) is less than the torque between the disc (88) and the crown ring (58).

14. Starter according to claim 13, wherein the ring (90) is prevented from rotating with respect to the casing (24).

* * * * *